United States Patent [19]

Lew

[11] 4,439,045

[45] Mar. 27, 1984

[54] ROTATIONAL MIXING VESSEL

[76] Inventor: Hyok S. Lew, 7890 Oak St., Arvada, Colo. 80005

[21] Appl. No.: 345,211

[22] Filed: Feb. 3, 1982

Related U.S. Application Data

[63] Continuation-in-part of Ser. No. 758,141, Jan. 10, 1977, Pat. No. 4,326,811.

[51] Int. Cl.³ ............................................. B01F 7/22
[52] U.S. Cl. .................................. 366/297; 366/279
[58] Field of Search .............. 366/270, 290, 291, 297, 366/298, 299, 300, 301, 279, 330, 64, 65, 66, 165, 315, 316, 317

[56] References Cited

U.S. PATENT DOCUMENTS

| | | | |
|---|---|---|---|
| 433,909 | 0/0000 | Sanders | 366/316 |
| 1,268,601 | 6/1918 | Nielsen | 366/330 |
| 1,548,935 | 8/1925 | Craddock | 366/330 |
| 1,652,960 | 12/1927 | Snelling et al. | 366/297 X |
| 2,546,691 | 3/1951 | Green | 366/297 X |
| 2,750,161 | 6/1956 | Simmons | 366/297 X |
| 2,911,334 | 11/1959 | Stuck | 366/330 X |

FOREIGN PATENT DOCUMENTS

| | | | |
|---|---|---|---|
| 1276986 | 9/1968 | Fed. Rep. of Germany | 366/66 |
| 1891 | of 1915 | United Kingdom | 366/297 |
| 953054 | 3/1964 | United Kingdom | 366/300 |

*Primary Examiner*—Philip R. Coe

[57] ABSTRACT

This invention relates to a mixing vessel employed in the mixing and agitation of the slurry in the mineral and chemical processing. The mixing vessel of the present invention comprises a cylindrical vessel and one or more propellers rotatably disposed within said cylindrical vessel adjacent to the cylindrical wall wherein the axis of the rotation of said one or more propellers is substantially perpendicular to the central axis of said cylindrical vessel; whereby, the rotation of said one or more propellers generates the thrust substantially tangential to the cylindrical wall of said cylindrical vessel and, thus, creates a rotating motion of the slurry contained in said cylindrical vessel about the central axis of said cylindrical vessel for the mixing and agitation of the slurry. Said rotational mixing vessel provides an advantage in saving the energy consumption required by the mixing vessel as well as the power consumption by the aerating vessel.

6 Claims, 13 Drawing Figures

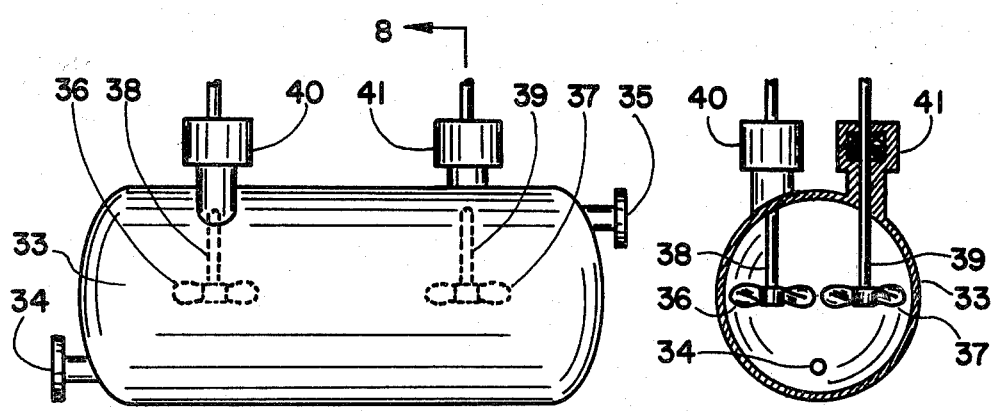
Fig. 7
Fig. 8
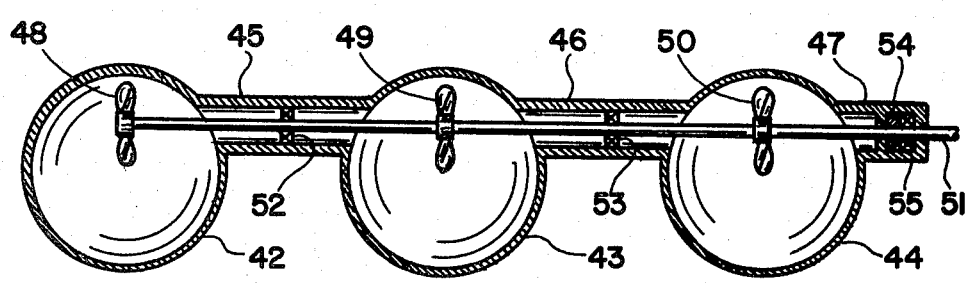
Fig. 9
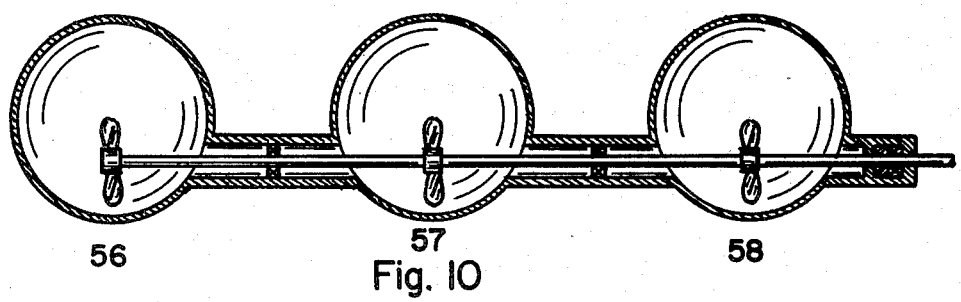
Fig. 10
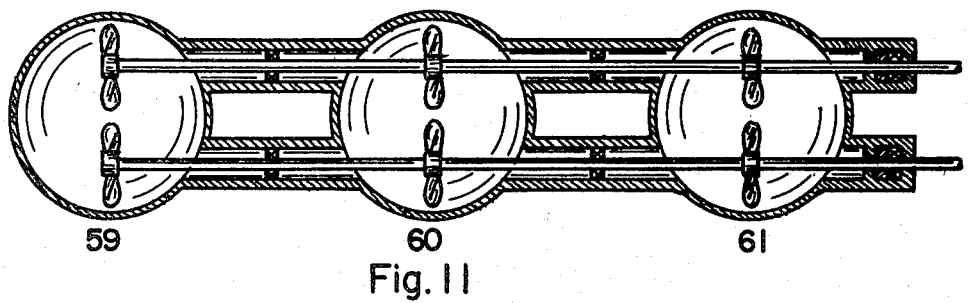
Fig. 11

ROTATIONAL MIXING VESSEL

This patent application is a continuation-in-part application to a patent application Ser. No. 758,141 entitled "The Rotational Mixing Method and Its Application to The Sealess Pressurized Mixing Vessels" filed in Jan. 10, 1977, and now U.S. Pat. No. 4,326,811.

The primary object of the present invention is to provide a rotational mixing vessel comprising a cylindrical vessel and one or more propellers rotatably disposed within said cylindrical vessel adjacent to the cylindrical wall wherein the axis of the rotation of said one or more propellers is substantially perpendicular to the central axis of said cylindrical vessel.

Another object of the present invention is to provide a rotational mixing vessel employing the whirling motion of the medium contained in said cylindrical vessel about the central axis of said cylindrical vessel created by the thrust generated by said one or more propellers for the mixing and agitation required for the mineral and chemical processing.

A further object of the present invention is to provide a plurality of said rotational mixing vessels arranged in parallel wherein one or more propellers in each of the cylindrical vessels are driven by one or more common shafts extending through said plurality of the rotational mixing vessel in the direction substantially perpendicular to the central axis of each of the cylindrical vessels.

Still another object of the present invention is to provide an aerating vessel wherein the air or gas is injected into the rotating medium contained in said cylindrical vessel through one or more nozzles disposed tangentially and directed to the rotating medium.

Still a further object of the present invention is to provide a rotational mixing vessel which is suitable for the construction of the pressurized sealess mixing vessel as described in the patent application Ser. No. 758,141 to which the present patent application is a CIP application.

These and other objects of the present invention will become clear as the description thereof proceeds. The present invention may be described with great clarity and specificity by referring to the following figures:

FIG. 7 illustrates a still another rotational mixing vessel including a plurality of the propellers installed in a staggered series.

FIG. 8 illustrates a cross section of the rotational mixing vessel of FIG. 7 taken along a plane 8—8 as shown in FIG. 7.

FIG. 9 illustrates a cross section of the plurality of the rotational mixing vessels arranged in parallel, which cross section is taken along a plane perpendicular to the central axis of the cylindrical vessels included in said plurality of the rotational mixing vessels wherein a common shaft extending through said plurality of cylindrical vessel drives the propellers included in each of the rotational mixing vessels, which propellers are disposed adjacent to the top portion of the cylindrical walls, respectively.

FIG. 10 illustrates a cross section of a plurality of the rotational mixing vessels wherein a common shaft extending through the plurality of the cylindrical vessels included in said plurality of the rotational mixing vessels drives the propellers disposed adjacent to the bottom portion of the cylindrical walls in each of the rotational mixing vessel, respectively.

FIG. 11 illustrates a cross section view of a plurality of the rotational mixing vessels wherein a pair of the common shafts extending through the plurality of the cylindrical vessels included in said plurality of the rotational mixing vessels drive a pair of series of the propellers wherein each of the first series of the propellers is disposed adjacent to the top portion of the cylindrical wall in each cylindrical vessel while each of the second series of the propellers is disposed adjacent to the bottom portion of the cylindrical wall in each cylindrical vessel.

Figure 12:
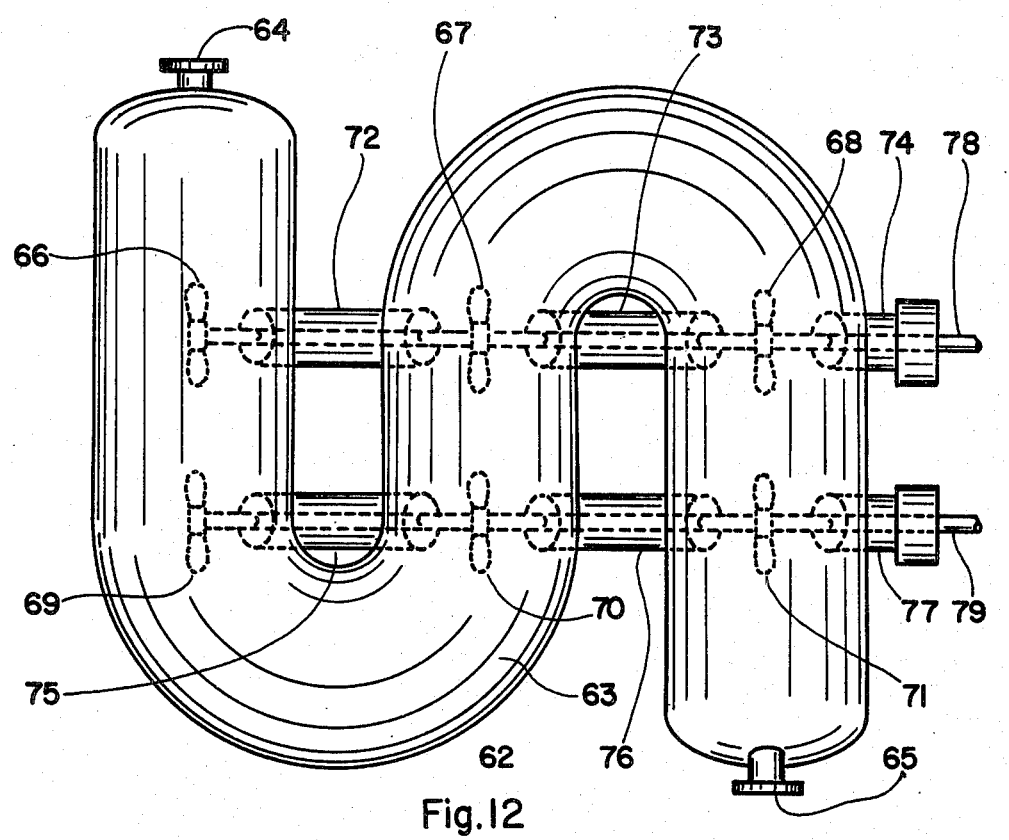

FIG. 12 illustrates a plan view of a rotational mixing vessel of a sinusoidal geometry including a plurality of the propellers driven by a plurality of the common shafts.

Figure 13:
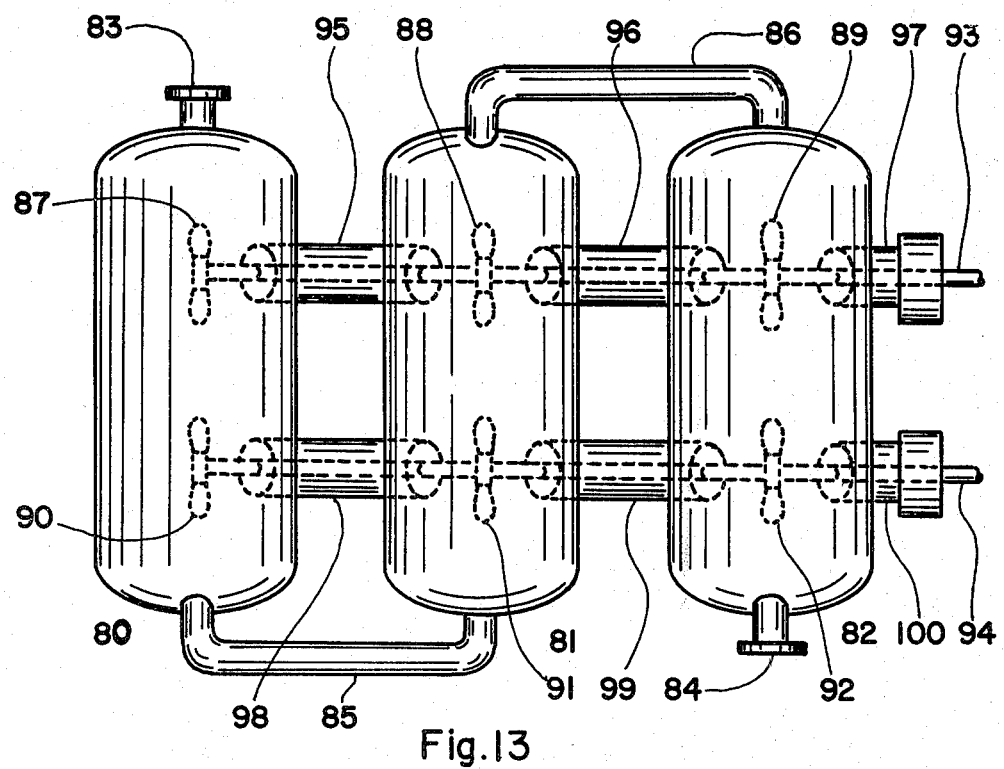

FIG. 13 illustrates a plan view of a plurality of the cylindrical rotational mixing vessels arranged in parallel including a plurality of the propellers driven by a plurality of the common shafts.

Figure 1:
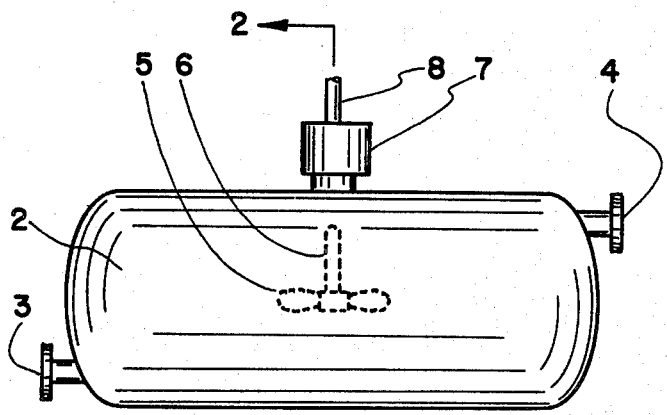
FIG. 1 illustrates a rotational mixing vessel including a single propeller, which is viewed in a direction perpendicular to the central axis of the cylindrical vessel included in said rotational mixing vessel.

In FIG. 1 there is shown a rotational mixing vessel 1 constructed in accordance with the principles of the present invention, which rotational mixing vessel is viewed in a direction perpendicular to the central axis of the cylindrical vessel 2 including an inlet 3 and an outlet 4. The mixing propeller 5 is rotatably disposed adjacent to the cylindrical wall 11 of said cylindrical vessel 2, which propeller 5 is installed on the shaft 6 engaging and extending through a flange assembly 7. The outside end 8 of the shaft 6 is connected to the drive means such as a pto shaft of a gear motor or pulley, sprocket, gear, etc., driven by a power unit.

In this arrangement of the mixing propeller 5, the plane of rotation of the propeller 5, which is the plane substantially including the blades of the propeller 5 and is perpendicular to the axis of rotation of the propeller 5 that axis coincides with the axis of the propeller shaft 6, substantially includes the central axis of the cylindrical vessel 2 which central axis is the line passing through the geometrical centers of all transverse cross sections of said cylindrical vessel 2.

Figure 2:
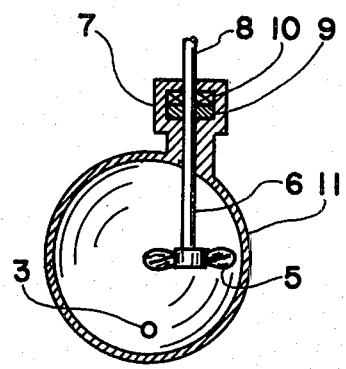
FIG. 2 illustrates a cross section of the rotational mixing vessel of FIG. 1, which cross section is taken along a plane 2—2 as shown in FIG. 1.

In FIG. 2, there is shown a cross section of the rotational mixing vessel 1 shown in FIG. 1, which cross section is taken along a plane 2—2 as shown in FIG. 1. The propeller 5 is rotatably disposed adjacent to the cylindrical wall 11 of the cylindrical vessel 2. The shaft 6 driving the propeller 5 extends through the flange assembly 7 including a sealing means 9 such as a packing seal or mechanical seal and a bearing means 10 such as a roller or ball bearing.

When the propeller 5 is rotated by the rotating shaft 6, the propeller generates a thrust on the liquid medium contained in the cylindrical vessel 2 in a direction substantially tangential to the cylindrical wall 11 on a plane substantially perpendicular to the central axis of the cylindrical vessel 2, which thrust induces and maintains the rotational mixing motion of the medium contained in cylindrical vessel 2 which mixing motion comprises the whirling movement of the medium about the central axis of the cylindrical vessel. The direction of the rotation in the rotational mixing may be either clockwise or counter clockwise depending on the specific operating condition. When the air or gas is injected into the rotating medium in the rotational mixing vessel through one or more nozzles disposed on the wall of the cylindrical vessel tangentially and pointed to the direction of the rotation of the medium, the rotational mixing motion provides an excellent aeration. Therefore, the rotational mixing vessel can be used as an aerating vessel too.

Figure 3:
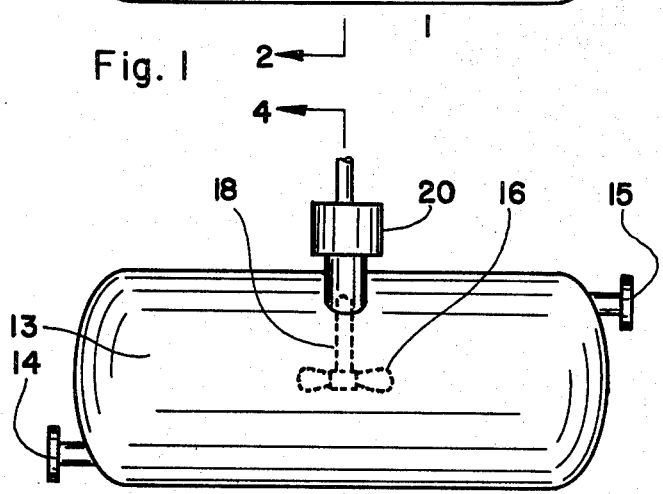
FIG. 3 illustrates another rotational mixing vessel including a pair of the propellers installed in side-by-side arrangement on a common plane.
Figure 4:
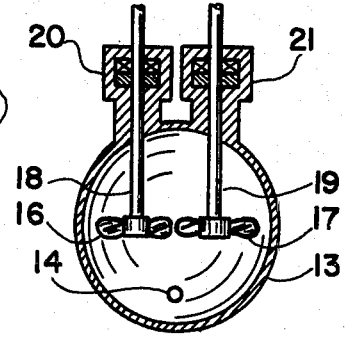
FIG. 4 illustrates a cross section of the rotational mixing vessel of FIG. 3 taken along a plane 4—4 as shown in FIG. 3.

In FIG. 3 there is shown another rotational mixing vessel 12 including a cylindrical vessel 13 with an inlet 14 and an outlet 15. As shown in the cross section view of FIG. 4 taken along a plane 4—4 as shown in FIG. 2, a pair of the propellers 16 and 17 are rotatably disposed adjacent to the cylindrical wall of the cylindrical vessel 13 at two diametrically opposite positions. Said pair of the propellers 16 and 17 are respectively mounted on a pair of shafts 18 and 19 extending through a pair of the flange assemblies 20 and 21 built on the cylindrical wall of the cylindrical vessel 13, respectively. Each of the pair of the flange assemblies 20 and 21 includes the sealing means and the bearing means as described in conjunction with FIG. 2.

Figure 5:
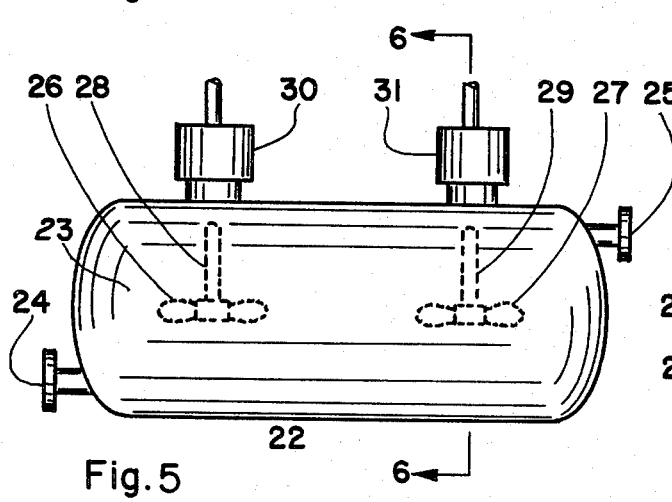
FIG. 5 illustrates a further rotational mixing vessel including a plurality of the propellers installed in a straight series.
Figure 6:
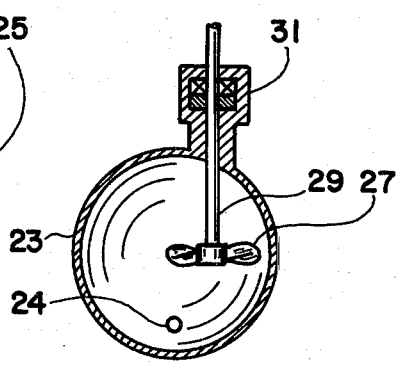
FIG. 6 illustrates a cross section of the rotational mixing vessel of FIG. 5 taken along a plane 6—6 as shown in FIG. 5.

In FIG. 5 there is shown a further rotational mixing vessel 22 comprising a cylindrical vessel 23 with an inlet 24 and an outlet 25 and a plurality of the propellers 26 and 27 rotatably disposed adjacent to the cylindrical wall of the cylindrical vessel 23 in a straight series, which propellers are disposed in a single row following one side portion of the cylindrical wall. The propellers 26 and 27 are mounted on a pair of shafts 28 and 29, respectively, each of which shafts extends through each of the flange assemblies 30 and 31 including the sealing means and the bearing means as mentioned inconjunction with FIG. 2. FIG. 6 shows a cross section of the rotational mixing vessel of FIG. 5, which cross section is taken along a plane 6—6 as shown in FIG. 5.

There is shown in FIG. 7 still another rotational mixing vessel 32 including a cylindrical vessel 33 with an inlet 34 and an outlet 35. A plurality of the propellers 36 and 37 respectively mounted on a plurality of shafts 38 and 39 are rotatably disposed adjacent to the cylindrical wall of the cylindrical vessel 33 in a staggered series wherein each adjacent pair of the propellers are disposed at two diametrically opposite position on two different planes perpendicular to the central axis of the cylindrical vessel 33. The shafts 38 and 39 extend through the flange assemblies 40 and 41, respectively, which flange assemblies include the sealing means and the bearing means. FIG. 8 illustrates a cross section of the rotational mixing vessel 32 of FIG. 7 taken along a plane 8—8 as shown in FIG. 7.

In FIG. 9 there is shown a cross section of a parallel assembly of a plurality of the rotational mixing vessel, which cross section is taken along a plane perpendicular to the central axis of the cylindrical vessels included in said assembly of the rotational mixing vessels. The cylindrical vessels 42, 43, 44, etc. are inter-connected to one another by the tubings 45, 46, 47, etc., which tubings are weld connected to the cylindrical walls of the cylindrical vessels in line and in eccentric location. The propellers 48, 49, 50, etc. are mounted on a common shaft 51 extending through the tubings 45, 46, 47, etc. The bearings 52, 53, etc. are installed in the tubings 45, 46, etc. to steady the shaft 51, while the tubing 47 includes the sealing means 54 and the bearing means 55. The shaft 51 is driven by a drive unit connected to the outside extremity of said shaft extending through the tubing 47. The rotational mixing vessels assembled in parallel as shown in FIG. 9 may be inter-connected by a plurality of the slurry passages to function as the series-system or may be independent parallel units fuctioning as a parallel-system merely driven by the common drive. It should be noticed in FIG. 9 that the propellers 48, 49, 50, etc. driven by the common shaft 51 are disposed adjacent to the top portion of the cylindrical walls of the cylindrical vessels included in the rotational mixing vessels.

In FIG. 10 there is shown a cross section of a parallel assembly of the rotational mixing vessels 56, 57, 58, etc. arranged and inter-connected to one another in the manner similar to those shown in FIG. 9. Here, the plurality of the propellers mounted on the common shaft are disposed adjacent to the bottom portion of the cylindrical walls of the cylindrical vessels included in the rotational mixing vessels.

In FIG. 11 there is shown a cross section of a parallel assembly of a plurality of the rotational mixing vessels wherein a pair of series of the propellers mounted on a pair of the common shafts are included in the train of the mixing vessels 59, 60, 61, etc. The first common shaft extends through the first series of tubings disposed along the upper half of the cylindrical vessels as the first series of the propellers are disposed adjacent to the top portion of the cylindrical walls of the cylindrical vessels, while the second common shaft extends through the second series of the tubings disposed along the lower half of the cylindrical vessels as the second series of the propellers are disposed adjacent to the bottom portion of the cylindrical walls of the cylindrical vessels included in the rotational mixing vessels. Each of the adjacent pair of the propellers disposed in each of the rotational mixing vessels may be disposed on a common plane or different plane perpendicular to the central axis of the cylindrical vessel. It is obvious that any number of the series of the propellers can be installed and driven by the corresponding number of the common shafts extending across any number of the cylindrical vessels. It should be mentioned that, when more than one propellers are employed in single rotational mixing vessel, the pitch and the direction of the rotation of the propellers must be in such a way that all thrusts generated by each propellers are in the same angular direction.

In FIG. 12 there is shown a plan view of a rotational mixing vessel comprising a vessel 63 of a sinusoidal configuration with a circular cross section, which vessel 63 includes an inlet 64 and an outlet 65. A plurality of the series of the propellers 66, 67, 68, etc. and 69, 70, 71, etc. are mounted on a plurality of the common shafts 78, 79, etc. respectively, each of which common shafts extends through each of the plurality of series of tubings 72, 73, 74, etc. and 75, 76, 77, etc. disposed in line across the rout of the vessel 63. Any one of the arrangements for the propellers shown in FIGS. 9, 10 and 11 or any combination there between may be employed in arranging the propellers in the sinusoidal vessel 63. Each individual propellers installed in the sinusoidal vessel 63 must have a proper pitch so that all of the propellers generate the thrust resulting in the rotational motion of the medium contained in the sinusoidal vessel 63 in the common direction.

In FIG. 13 there is shown a plan view of a parallel assembly of a plurality of the cylindrical rotational mixing vessels 80, 81, 82, etc. The medium to be mixed is fed into the first rotational mixing vessel 80 through an inlet 83, while the medium is discharged through an outlet 84 from the last rotational mixing vessel 82. A pair of the medium passage tubings 85 and 86 provides the medium transport from the rotational mixing vessel 80 to 81 and from 81 to 82, respectively. A plurality of the series of the propellers 87, 88, 89, etc. and 90, 91, 92, etc. are mounted on a plurality of the common shafts 93, 94, etc., respectively, each of which common shafts extends through each of the series of the plurality of the interconnecting tubings 95, 96, 97, etc. and 98, 99, 100, etc. In arranging the propellers included in the parallel assembly of the cylindrical rotational mixing vessels shown in FIG. 13, any one of the propeller arrangements illustrated in FIGS. 9, 10 and 11 or any combination therebetween may be employed.

While the principles of the invention have now been made clear by the illustrative embodiment, there will be immediately obvious to the skilled in the art many modifications of the arrangement, elements, proportion and material particularly adapted to the specific working environment and operating condition without departing from those principles of the present invention.

I claim:

1. A rotational mixing vessel for mixing and agitating the fluid medium and slurry contained in said rotational mixing vessel, said mixing vessel comprising in combination:
   (a) a cylindrical vessel having an inlet and an outlet; and
   (b) a propeller rotatably disposed adjacent to the cylindrical wall of said cylindrical vessel wherein the plane of rotation of said propeller substantially includes the central axis of said cylindrical vessel and the axis of the rotation of said propeller is substantially parallel to a tangential plane of said cylindrical wall of said cylindrical vessel and substantially perpendicular to and offset from the central axis of said cylindrical vessel; whereby, the rotation of said propeller generates a thrust force tangential to the cylindrical wall of said cylindrical vessel and substantially perpendicular to the central axis of said cylindrical vessel for inducing and maintaining the rotational motion of said medium rotating about the central axis of said cylindrical vesel.

2. A rotational mixing vessel for mixing and agitating the fluid or slurry contained in said rotational mixing vessel, said rotational mixing vessel comprising in combination:
   (a) a cylindrical vessel having an inlet and an outlet; and
   (b) a plurality of the propellers rotatably disposed adjacent to the cylindrical wall of said cylindrical vessel wherein the plane of rotation of each of said propellers substantially includes the central axis of said cylindrical vessel and the axis of the rotation of each of said propellers is substantially parallel to a tangential plane of said cylindrical wall of said cylindrical vessel and substantially perpendicular to and offset from the central axis of said cylindrical vessel; whereby, the rotation of said plurality of the propellers generates thrust forces tangential to the cylindrical wall of said cylindrical vessel and substantially perpendicular to the central axis of said cylindrical vessel for inducing and maintaining the rotational motion of said medium rotating about the central axis of said cylindrical vessel.

3. The combination as set forth in claim 2 wherein said plurality of the propellers include one or more pairs of the propellers disposed at two diametrically opposite positions on a substantially common plane.

4. The combination as set forth in claim 2 wherein said plurality of the propellers include a plurality of the propellers disposed in a single series along the cylindrical wall of said cylindrical vessel.

5. The combination as set forth in claim 2 wherein said plurality of the propellers include two or more propellers disposed in two series in rows substantially parallel to the central axis of said cylindrical vessel, the first of said two series of the propellers are disposed in a row diametrically opposite to the second row of said two series of the propellers wherein the propellers in the first of said two series of the propellers are disposed in a staggered pattern with respect to the propellers in the second of said two series of the propellers.

6. The combinations as set forth in claim 2 wherein said cylindrical vessel is a sinusoidally curved vessel.

* * * * *